3,657,236
PRODUCTION OF MELAMINE
Hermann Dieter Fromm, Gruenstadt, Karl Wilhelm Leonhard, Ludwigshafen, Rudolf Mohr, Lampertheim, and Matthias Schwarzmann and Horst Woehrle, Limburgerhof, Germany, assignors to Badische Anilin- & Soda-Fabrik Aktiengesellschaft, Ludwigshafen (Rhine), Rhineland-Pfalz, Germany
No Drawing. Filed Nov. 19, 1969, Ser. No. 878,190
Claims priority, application Germany, Dec. 2, 1968, P 18 12 120.5
Int. Cl. C07d 55/28
U.S. Cl. 260—249.7 A        4 Claims

ABSTRACT OF THE DISCLOSURE

To produce melamine, urea and/or its thermal decomposition products are reacted at 220° to 400° C. in contact with an aluminum oxide having a large surface area in the presence of ammonia. The aluminum oxide used has been obtained by treatment of hydroxides of aluminum (which have not been previously calcined) with urea and/or its thermal decomposition products at temperatures of from 150° to 400° C. The advantages of aluminum oxide activated in this manner over aluminum oxide obtained by calcining aluminum hydroxide consist in increased urea conversion and greater attrition resistance.

---

It is known that urea can be converted into melamine at temperatures of from 220° to 450° C. in contact with active aluminum oxides having large surface area in the presence of ammonia or of a gas containing ammonia.

The active aluminum oxides having large surface area are obtained by calcining aluminum hydroxides such as boehmite, bayerite or hydrargillite at temperatures of more than 600° C. up to about 1,000° C.

It is also known that any amounts of water adhering to the aluminum oxides do not disturb the melamine synthesis because they are removed by reaction with urea ammonia and carbon dioxide being formed. The disadvantage of aluminum oxides obtained in this way lies mainly in the fact that their manufacture is expensive and they are not very resistant to abrasion.

We have now found that the synthesis of melamine from urea and/or its thermal decomposition products in the presence of catalysts can be carried out advantageously by using as the catalyst an aluminum oxide which has been obtained by treatment, at temperatures of from 150° to 400° C., of hydroxides of aluminum (which have not previously been calcined and which can be converted into thermally stable oxides by dehydration) with urea or with thermal decomposition products thereof formed within this temperature range.

Boehmite, bayerite and hydrargillite are examples of hydroxides of aluminum which can be converted by dehydration into thermally stable oxides. The hydroxides are preferably treated at temperatures of from 300° to 400° C. Not only urea, but also the thermal decomposition products formed from urea in the said temperature range such as cyanic acid, isocyanic acid, cyanuric acid, biuret, triuret, ammeline, melem or melamine itself are suitablue. It is, however, advantageous to use urea. It is probable that urea has a dehydrating effect on the hydroxides mainly in the form of its thermal decomposition product isocyanic acid which is converted with the absorption of water into ammonia and carbon dioxide.

It is possible to prepare the catalysts spearately from the melamine synthesis by treating them separately with urea or its thermal decomposition products. The treatment may be carried out for example by impregnating the aluminum hydroxide with a melt of urea or a solution of urea and heating the mixture to the said temperatures. It is also possible, however, to fluidize granules of aluminum oxide and to supply urea in solid or molten form to the fluidized bed at the said temperatures. Another embodiment for the formation of the catalysts may consist for example in passing thermal decomposition products of urea over a fixed or fluidized bed of aluminum hydroxide at the said temperatures.

According to a preferred embodiment the formation of the catalyst may also be carried out direct in the reactor for the melamine synthesis. In this way a separate step for the production of the catalyst is unnecessary because the oxides of aluminum are formed under the conditions of the melamine synthesis. This synthesis is carried out, as is already known, at from 300° to 450° C. and at pressures from atmospheric pressure to about 10 atmospheres. At the beginning of the synthesis of melamine, the reactor may be charged with granules of aluminum hydroxide having a diameter of from 0.02 to 1.0 mm., fluidized with ammonia or a gas containing ammonia, for example the offgas (freed from melamine and containing ammonia and carbon dioxide), and heated to the synthesis temperature of from 300° to 450° C. Urea in molten or solid form is then added but is not converted into melamine until the hydroxide has been completely converted into the oxide. It is only when this dehydration is over that melamine is formed.

It is, of course, possible to replace any catalyst lost by attrition during the synthesis by supplying more aluminum hydroxide which is then converted into the oxidic catalyst in the manner described above.

The advantages of the catalysts to be used according to this invention over the use of catalysts obtained in the conventional way consist in increased urea conversion and decreased attrition. The fact that the oxides can be formed within the melamine synthesis synthesis represents another simplification because a separate step for their formation is unnecessary.

Surprisingly, the catalysts according to the invention have a better activity than catalysts obtained conventionally by calcining at high temperatures.

The following examples illustrate the invention.

EXAMPLE 1

Boehmite having granules sized from 0.05 to 0.5 mm. is fluidized with ammonia in a fluidization reactor. The fluidizde bed is heated to 350° C. by a tubular heat exchanger. Urea is fed into the fluidized bed until melamine is detected in the offgas. X-ray analysis of the catalyst obtained shows that the boehmite has been converted into $\gamma$-aluminum oxide.

To test the aluminum oxide obtained in this way, 3 liters of the catalyst is placed in a fluidization reactor having a diameter of 100 mm. and 300 g. of urea and a gas mixture of 600 liters (STP) of ammonia and 300 liters (STP) of carbon dioxide as fluidizing gas are introduced per hour.

The conversion of urea, the catalyst attrition and the duration of the experiment are set out in Table A.

For comparison, the corresponding values obtained under otherwise identical conditions but using a catalyst which has been obtained by calcination of boehmite at 800° C. are given in Table B.

TABLE A

[$\gamma$-$Al_2O_3$ obtained by treating boehmite with urea]

| Day: | Urea conversion, percent | Attrition[1] |
|---|---|---|
| 1 | 85 | 0.4 |
| 2 | 96.2 | 0.3 |
| 5 | 96.0 | 0.3 |
| 10 | 96.3 | 0.2 |
| 30 | 96.2 | 0.2 |

[1] Per day in percent by weight of the total amount.

TABLE B

[$\gamma$-$Al_2O_3$ obtained by calcination of boehmite at 800° C.]

| Day: | Urea conversion, percent | Attrition[1] |
|---|---|---|
| 1 | 90 | 1.2 |
| 2 | 95.4 | 0.4 |
| 5 | 94.0 | 0.4 |
| 10 | 95.8 | 0.3 |
| 30 | 95.2 | 0.4 |

[1] See footnote bottom of Table A.

From a comparison of the two tables it is apparent that urea conversion is considerably increased by the use of the catalysts according to this invention and that the attrition of the catalysts according to this invention is about half so much as that of the prior art catalysts after 30 days.

Results similar to those in Table A are obtained by adopting the same procedure but using a catalysts obtained from bayerite or hydrargillite instead of a catalyst obtained from boehmite.

We claim:
1. In a process for the production of melamine in a fluidized bed from urea or the thermal decomposition products of said urea at elevated temperature and in the presence of an aluminum oxide catalyst, the improvement of using as said catalyst an abrasion resistant aluminum oxide obtained by treating a non-calcined hydroxide of aluminum at a temperature of from 150° to 400° C. with urea or thermal decomposition products of said urea formed at said treatment temperature, such that said hydroxide of aluminum is converted by dehydration into a heat stable oxide.

2. A process as claimed in calim 1 wherein the hydroxide of aluminum which has not been previously calcined is introduced into the fluidized bed for the melamine synthesis and converted therein into the catalyst.

3. A process as claimed in claim 1 wherein the hydroxide is boehmite, bayerite or hydrargillite.

4. A process as claimed in claim 1 wherein the treatment of the hydroxide is carried out at from 300° to 400° C.

References Cited

UNITED STATES PATENTS 3,513,167  5/1970  Fromm et al. _____ 260—249.7
3,432,501  3/1969  Weinrotter et al. ____ 260—249.7

JOHN M. FORD, Primary Examiner

PO-1050
(5/69)

UNITED STATES PATENT OFFICE
CERTIFICATE OF CORRECTION

Patent No. 3,657,236           Dated April 18, 1972

Inventor(s) Hermann Dieter Fromm et al

It is certified that error appears in the above-identified patent and that said Letters Patent are hereby corrected as shown below:

Column 1, line 63, "suitablue" should read -- suitable --.

Column 2, line 53, "fluidizde" should read -- fluidized --.

Column 3, line 19, "$\gamma$-$Al_2O_3$" should read -- $\alpha$-$Al_2O_3$ --; Table B, "95.4" should read -- 94.5 --.

Column 4, line 19, claim 2, "calim" should read -- claim --.

Signed and sealed this 5th day of December 1972.

(SEAL)
Attest:

EDWARD M. FLETCHER, JR.　　　　　　　　　ROBERT GOTTSCHALK
Attesting Officer　　　　　　　　　　　　　Commissioner of Patents